Feb. 7, 1950  B. E. DEL MAR  2,496,862
VENTILATION SYSTEM
Filed July 15, 1946
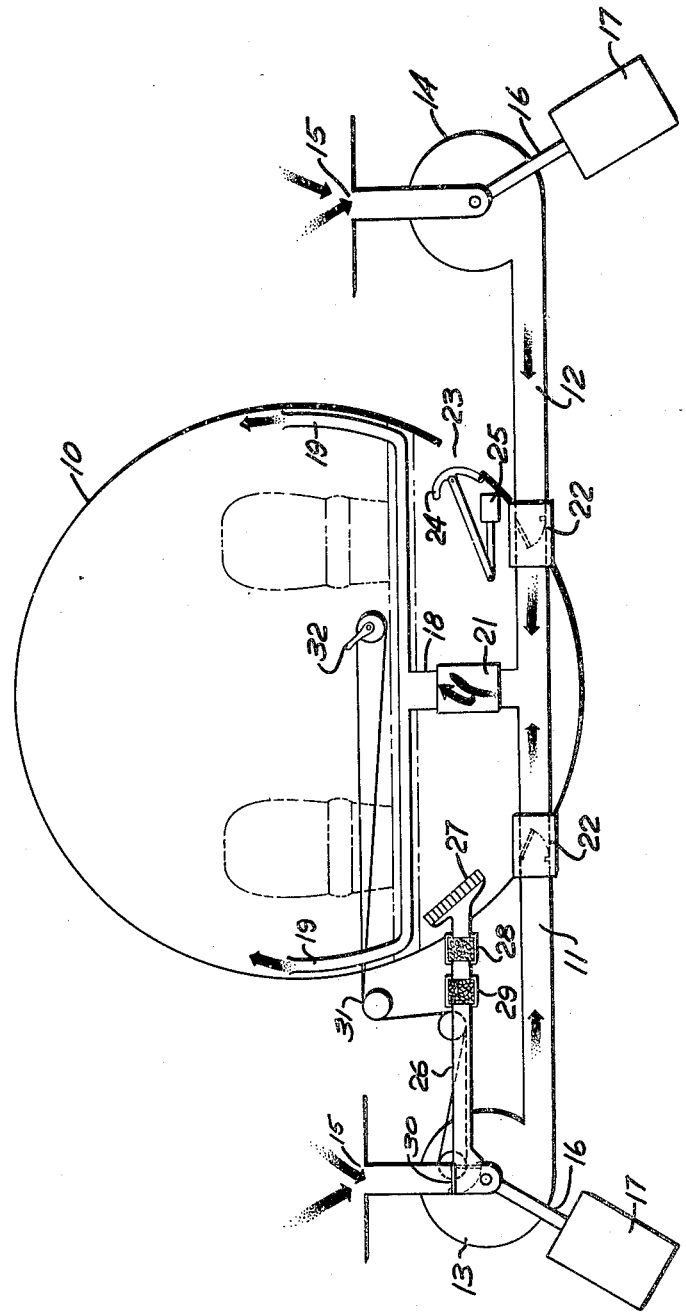
INVENTOR.
BRUCE E. DEL MAR
BY J. Edwin Coates
ATTORNEY Patented Feb. 7, 1950

2,496,862

UNITED STATES PATENT OFFICE 2,496,862

VENTILATION SYSTEM

Bruce E. Del Mar, Los Angeles, Calif., assignor to Douglas Aircraft Company, Inc., Santa Monica, Calif.

Application July 15, 1946, Serial No. 683,805

5 Claims. (Cl. 98—1.5)

This invention relates to a ventilation system and more particularly to such a system for pressurized aircraft cabins.

In control systems for pressurized aircraft cabins heretofore proposed one or more air delivering means such as superchargers have been used to supply ambient air to the cabin under a pressure greater than ambient flight pressure. Although such systems with varying success regulated the absolute pressure of the air within the cabin, considerable difficulty has been experienced in maintaining and regulating the humidity of the cabin air, particularly in flight operations where the ambient air supplied to the cabin had to be heated prior to its introduction into the cabin. As should be understood, the heating of the air reduces the relative humidity of the air and if the same is not humidified the air becomes uncomfortably dry and must be held at a higher temperature for the comfort of the passengers.

In the system of the present invention air is supplied to the cabin by a plurality of superchargers. The pressure of the air within the cabin may be controlled by any regulatory means desired for varying the rate of air discharge from said cabin relative to the rate of air delivery to said cabin. The temperature of the cabin air can be regulated by heating and cooling means of any type desired through which the air is passed prior to its introduction into the cabin.

It is possible to maintain the air at a comfortable relative humidity during those flight operations which require that the temperature of the ambient air be raised prior to its introduction into the cabin, by recirculating a part of the cabin air. The air recirculated will, of course, be warm and need not be heated prior to its reentry into the cabin and, consequently, the humidity of this air remains substantially constant. This can be accomplished by a fan or blower for circulating the air through a duct supplied with suitable filters for deodorizing the air recirculated and for removing impurities from the air. The fan or blower and the means for operating the same increase the gross weight of the aircraft, which is objectionable for it reduces the load capacity of the aircraft.

The present invention provides a recirculation system which utilizes one of the superchargers required to pressurize the cabin for recirculating the air and thus eliminates the use of a separate fan or blower and the means for operating the same. A further saving in weight of the equipment necessary to recirculate the air is possible, for the cabin air inlet duct can also be used as a part of the recirculation duct system. The recirculation duct system includes a duct leading from the cabin to the inlet of the one supercharger, and passage of air through this duct is controlled by a valve system which is so formed that the supercharger inlet is closed when air is being drawn from the cabin.

The duct leading from the cabin to the supercharger inlet is furnished with suitable filtering units for deodorizing and filtering the air recirculated. The filtering units are preferably mounted so that the same are easily accessible to the end that they can be quickly removed for servicing. As the filtering units are accessible they can be easily removed if flights are to be made under weather conditions which will not require that the incoming air be heated to any large extent prior to its introduction into the cabin. This feature permits a weight saving highly desirable in commercial airline operation.

As only the one supercharger is used as a recirculating fan or blower, sufficient amounts of fresh air are supplied to the cabin by the other superchargers to maintain the air wholesome within the cabin. Other features and advantages of the present invention will be apparent from the following description of the invention taken in connection with the accompanying drawing in which the figure is a diagrammatic view of an aircraft cabin showing my ventilation system.

The system of the present invention, referring now to the drawing, is shown in connection with a sealed aircraft cabin 10. Air is directed into the cabin through air ducts 11 and 12 arranged to deliver a flow of air to the cabin from supercharging blowers 13 and 14 respectively. The blowers, as will be understood, are required to force air into the cabin to maintain the absolute pressure of the cabin air in excess of ambient air pressure during flights of the aircraft at relatively high altitudes.

The blowers are arranged to be supplied with air from ram ducts 15 and are driven through shafts 16 by speed control prime movers 17 in such a manner that a substantially constant rate of air flow is supplied through the ducts 11 and 12 to the cabin 10.

Air from the ducts 11 and 12 is led into the cabin through an inlet duct 18 formed with a plurality of discharge conduits 19 located at spaced points in the aircraft cabin. Mounted in the inlet duct 18 is a temperature regulating means diagrammatically shown at 21 which may be of the type described and claimed in my copending application Serial No. 675,795, now Patent No. 2,451,280.

Check valves 22 are arranged in each of the ducts 11 and 12 and are so formed that they are opened by the flow of air through the ducts but will close and seal the ducts to maintain cabin pressure in the event of failure of air flow through the ducts.

A discharge opening 23 is formed in the wall of the cabin 10 which is adapted to be closed or variably restricted by a suitable valve 24 controlled by some pressure responsive control system diagrammatically illustrated at 25. As the rate of air delivery is substantially constant cabin absolute pressure can be increased by restricting or closing the opening and decreased by opening the same. The discharge opening 23 is preferably located on the cabin wall in a region where the pressure along the wall is, due to surface air velocities, slightly less than that of the ambient atmosphere.

As the supercharging blowers 13 and 14 supply the cabin with ambient air for pressurizing the cabin, the air obviously will have to be heated before its passage into the cabin during cold weather operations and where the aircraft is being flown at altitudes at which the air is relatively cold. The heating of the air will obviously reduce the relative humidity of the incoming air, and the air conditioning means 21 preferably includes some means for humidifying the heated air. This requires a supply of water to be introduced into the incoming air stream, and this water supply where the aircraft is to be flown relatively long distances must be a relatively large one.

To reduce the amount of water which must be carried for humidifying the air supplied to the cabin during operations in cold air, the present invention provides means for recirculating at least a part of the air supplied to the cabin. As should be understood, this will aid maintaining the relative humidity of the air in the cabin for the air recirculated will be warm and need not be heated prior to its reintroduction into the cabin. In other words, while the amount of air furnished to the cabin is maintained constant, only one-half as much heated ambient air, which is very dry, need be introduced into the cabin during these conditions.

The air is recirculated, in the now preferred embodiment of the present invention, by providing a duct 26 leading from a suitable register 27 in the cabin 10 to the ram inlet 15 of the supercharging blower 13. A plurality of filter units are mounted within the duct 26 for the purpose of deodorizing and filtering the air withdrawn from the cabin before it is again introduced into the same.

The filter units preferably comprise a dust removing unit 28 and one containing activated charcoal here shown at 29. The dust filter 28 should be located between the cabin and the deodorizing unit 29 to prevent the charcoal from becoming fouled with dust and other foreign particles in the cabin air.

The filter units are preferably mounted within the cabin for easy removal to facilitate cleaning and maintenance of the filters and also to permit their removal from the aircraft if the same is to be flown under weather conditions in which the air is not heated to any large extent before it is supplied to the cabin.

To permit the air to be withdrawn from the cabin through the duct 26, a valve 30 is so mounted that it can be used to selectively close the ram inlet 15 of the blower 13 and open the duct 26 to the passage of air when flight conditions necessitate recirculation of the air. It will be seen that the valve is movable between alternate positions in which either the inlet 15 or the duct 26 is closed to the passage of air.

Although any means desired may be used to control the position of the valve 30, to simplify the illustration of the invention this means is shown as a cable and pulley system 31 adapted to be operated by a hand lever 32 located in the pilot's compartment of the aircraft. As should be understood, operation of the hand lever 32 will either close the ram inlet 15 and open the duct 26 or close the duct 26 and open the ram inlet 15, depending upon the direction of movement of the hand lever 32.

The use of one of the supercharging blowers required for pressurizing the cabin to recirculate a part of the cabin air obviates the use of a separate circulating fan or blower and a power means for operating the same and thus eliminates the weight of this equipment.

The recirculating duct 26 does not greatly add to the gross weight of the aircraft, as this duct can be made very small even though the pressure drop through this duct may be very large. This is possible because when the supercharger 13 is used to recirculate the air, the latter has an abundance of power, and the heating associated with a high duct pressure loss will not be important since the conditions of use of the recirculation system involves heating of the cabin considerably above the temperature of the ambient air.

Although the now preferred embodiment of the invention has been shown and described herein, it is to be understood that the invention is not to be limited thereto for the invention is susceptible to changes in form and detail within the scope of the appended claims.

I claim:

1. A ventilation system for an aircraft cabin comprising: a plurality of means for delivering ambient air to said cabin under a pressure higher than ambient flight pressure for pressurizing the same; duct means leading from the outlet of each air delivering means to said cabin; duct means leading from the cabin to the inlet of one of said air delivering means; and valve means operable to close said inlet so that air can be withdrawn from said cabin by said one air delivering means and delivered thereby to said cabin whereby at least a part of the air within said cabin can be recirculated.

2. A ventilation system for an aircraft cabin comprising: a plurality of superchargers for delivering ambient air to said cabin for pressurizing the same; an inlet duct leading to said cabin; duct means leading from the outlet of each supercharger to said inlet duct; duct means leading from the cabin to the inlet of one of said superchargers; valve means operable to close said inlet so that air can be withdrawn from said cabin by said one supercharger and delivered thereby to said cabin whereby at least a part of the air within said cabin can be recirculated; and filter means mounted in the duct means leading from said cabin to the one supercharger.

3. A ventilation system for an aircraft cabin comprising: a plurality of means for delivering ambient air to said cabin for pressurizing the same; an inlet duct leading to said cabin; duct means leading from the outlet of each air delivering means to said inlet duct; heating means in said inlet duct for heating air therein; duct means leading from the cabin to the inlet of one of said air delivering means; valve means for closing said last named duct means; means within said cabin for operating said valve means to close the inlet of said air delivering means and open said duct means leading to said inlet whereby said air delivering means can be used to recirculate at least a part of the air within said cabin; and a plurality of filter units arranged in said duct means leading from the cabin to the one air delivering means for cleaning and deodorizing the air withdrawn from the cabin.

4. A ventilation system for an aircraft cabin, comprising: a plurality of means for delivering ambient air under a pressure higher than ambient pressure to said cabin for pressurizing the same; duct means leading from the cabin to the inlet of one of said air delivering means; valve means disposed at the intersection of said last named duct means and the inlet for ambient air of said one air delivering means and movable between alternate positions, said valve means in one of said positions closing said inlet and opening said duct means and in the other of said positions closing said duct means and opening said inlet means; and means within said cabin for moving said valve means to and from said alternate positions whereby said valve means may be moved to the position in which the same closes said inlet and opens said duct means so that said air delivering means can be used to recirculate at least a part of the air furnished to said cabin.

5. A ventilation system for an aircraft cabin, comprising: a plurality of means for delivering ambient air under a pressure higher than ambient pressure to said cabin for pressurizing same; duct means leading from the cabin to the inlet of one of said air delivering means; valve means, movable to alternate positions, so disposed and organized with reference to said duct means and to said inlet as, in one of said alternate positions, to close said inlet and open said duct means and, in the other of said alternate positions, to close said duct means and open said inlet; and means within said cabin operable to effect movement of said valve means to and from said alternate positions whereby said delivering means may be employed either as a supercharger to charge the cabin from the ambient atmosphere or as a fan to recirculate at least a part of the cabin air back thereinto.

BRUCE E. DEL MAR.

REFERENCES CITED

The following references are of record in the file of this patent:

UNITED STATES PATENTS

| Number | Name | Date |
|---|---|---|
| 1,985,050 | Merle | Dec. 18, 1934 |
| 2,002,057 | Gregg | May 21, 1935 |
| 2,109,512 | Stacey, Jr. | Mar. 1, 1938 |
| 2,119,402 | Puffer | May 31, 1938 |
| 2,303,334 | Dauphinee | Dec. 1, 1942 |
| 2,328,489 | Pfau | Aug. 31, 1943 |
| 2,439,793 | Braddon | Apr. 20, 1948 |
| 2,444,951 | Paget | July 13, 1948 |